United States Patent [19]
Porter

[11] 3,796,268
[45] Mar. 12, 1974

[54] ONE-ROW CROP CUTTING OR DIGGING MACHINE

[76] Inventor: Wellington W. Porter, R.D. 2 Dublin Rd., Waterloo, N.Y. 13165

[22] Filed: Oct. 25, 1972

[21] Appl. No.: 300,459

[52] U.S. Cl.............. 171/88, 171/28, 56/327 R
[51] Int. Cl............................... A01d 31/00
[58] Field of Search ........ 171/14, 28, 88; 56/327 R

[56] References Cited
UNITED STATES PATENTS

| | | | |
|---|---|---|---|
| 2,588,764 | 3/1952 | Richmond............................. | 171/14 |
| 3,295,301 | 1/1967 | Looker................................. | 171/14 |

*Primary Examiner*—Antonio F. Guida
*Attorney, Agent, or Firm*—Charles S. McGuire

[57] ABSTRACT

Apparatus for cutting crops, particularly those planted in spaced rows, at or near ground level, thereby cutting off and "windrowing" an upper portion of the crop and leaving a lower portion in the ground. The machine may also be used for digging and windrowing crops growing in rows a short distance below ground level. The apparatus is drawn and powered by a tractor, the power takeoff unit of which provides counter rotation to a pair of overlapped disks having sawtoothed cutting edges, and the tractor hydraulic system actuating a pair of cylinders to lift and lower the cutting mechanism. The cutter disks are preferably located approximately midway between the rear-mounted wheels and the point of attachment of the cutting machine tongue to the tractor drawbar.

7 Claims, 4 Drawing Figures

ONE-ROW CROP CUTTING OR DIGGING MACHINE

BACKGROUND OF THE INVENTION

Mechanical cutting of farm crops, and the like, by apparatus performed either by cutting a swath of significant width, or by cutting at a more localized point. Where the crop being cut is growing in substantially straight, spaced rows it is often more feasible to use cutting apparatus of the type which cuts at a localized point, moving the apparatus through the field with such point moving along to cut one row at a time. Among the cutting mechanism which have been used to sever crops in this manner are overlapped, rotating disks traveling in a plane parallel, or at a relatively small angle, to the ground. Cutting edges on the disks sever the stalks, vines, etc., as they come between the overlapped disks.

The present invention relates to apparatus of the latter type and has as a principal object the provision of apparatus for cutting, digging and windrowing crops, one row at a time, in a novel and improved manner.

More specifically, the object of the invention is to provide a one-row crop cutter using counter-rotating disks which is versatile, yet simple and economical in manufacture and operation, operates equally well on a variety of crops and is constructed to work well on uneven ground. It is also an object to provide a crop cutting machine which is adjustable to allow use of the cutting mechanism as a means for digging and windrowing relatively shallow-ground crops.

SUMMARY OF THE INVENTION

In accordance with the foregoing objectives, the crop cutting and digging apparatus of the invention utilizes a pair of overlapped disks connected to drive shafts and mounted on a frame disposed in a substantially vertical plane. The disk mounting frame is supported on each side by a parallelogram linkage extending from a rigid main frame. A tongue is provided for attachment to a tractor hitch or drawbar and a shaft for transmitting rotary motion is positioned for attachment to the tractor power take-off. A pair of sprockets on the rear end of the shaft transmit rotation through respective chains to drive shafts for the two disks. The entire apparatus is mounted on a pair of wheels which straddle the row of crops being cut, and the disks are positioned substantially midway between the wheels and the point of attachment of the tongue to the tractor. Thus, vertical movement of the cutter disks is only about one-half that of the tractor or cutting machine wheels due to movement over uneven ground, rocks, or the like.

The height of the disks with respect to the ground is adjustable by hydraulic cylinders powered from the tractor and allows the cutting action to take place above or below the ground surface. The angle of the plane of the cutter disks with respect to the horizontal is also adjustable about a horizontal axis transverse to the direction of movement of the machine.

DETAILED DESCRIPTION OF THE PREFERRED EMBODIMENT

Figure 1:
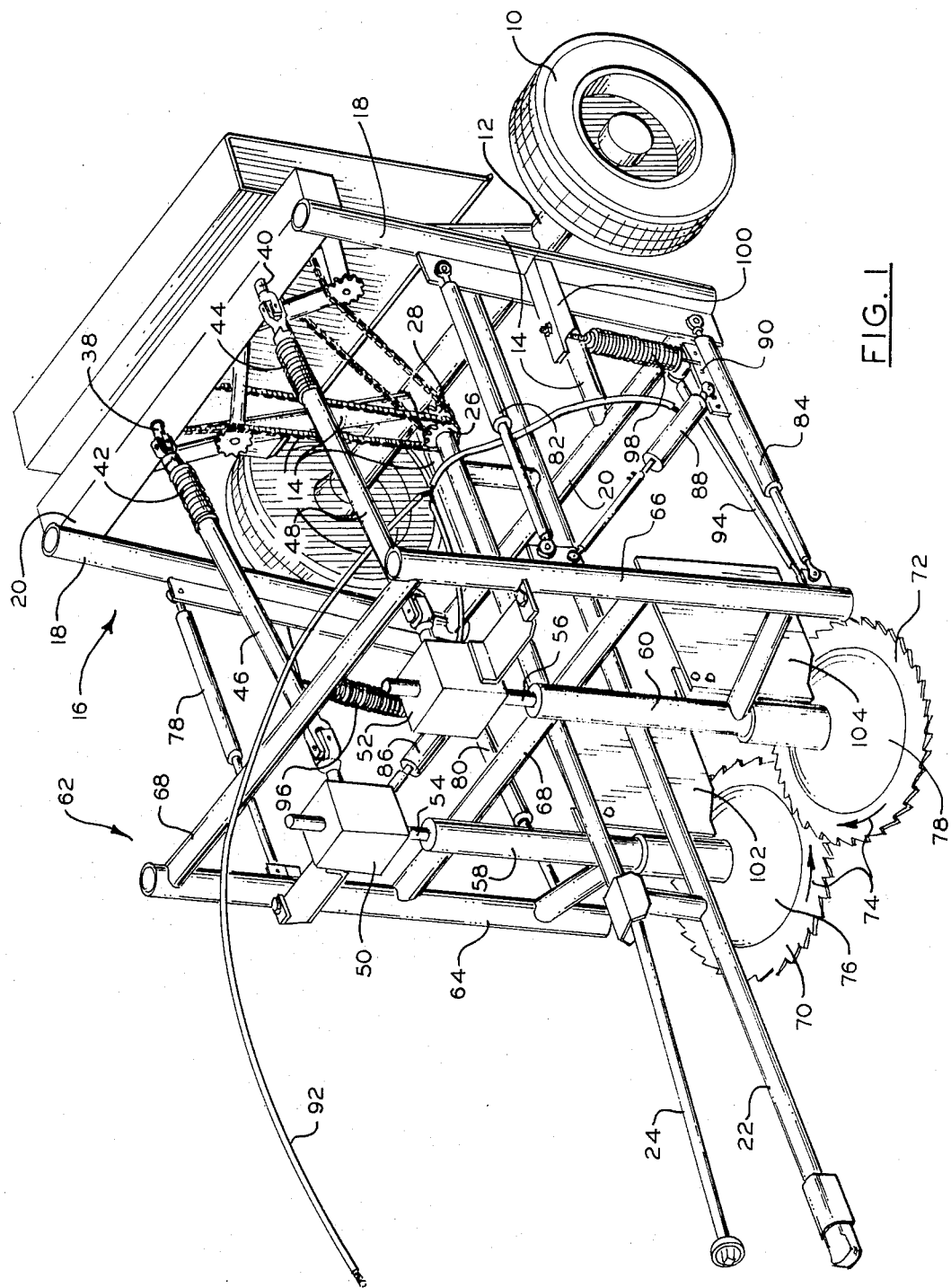
FIG. 1 is a perspective view of the preferred embodiment of the invention.

The machine is supported for movement on a pair of wheels 10 mounted on axle 12. Rigidly supported upon axle 21 by appropriate braces 14 is rigid main frame 16, comprising upright structural members 18 and upper and lower lateral members 20. Extending from axle 12 substantially along the centerline of the apparatus is tongue 22, for attachment at its forward end to a tractor drawbar or other hitch.

Figure 4:
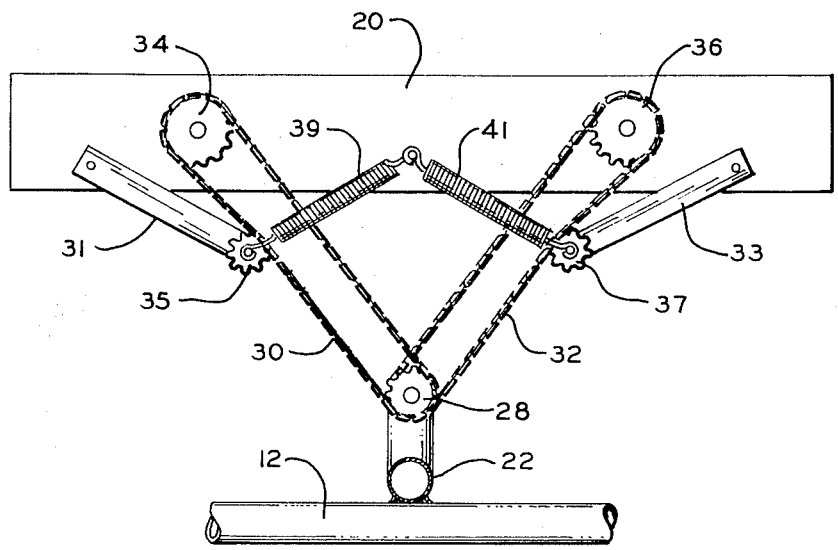
FIG. 4 is a fragmentary, elevational view in section on the line 4—4 of FIG. 2.

Supported upon tongue 22 is shaft 24 having a forward end adapted to be attached to the tractor power take-off unit and transmit rotary motion to a pair of sprockets 26 and 28 mounted on the rear end of the rotatable shaft. Endless chains 30 and 32 pass around sprockets 26 and 28, respectively, and around a second pair of sprockets 34 and 36, as seen in FIG. 4. Arms 31 and 33 are pivotally mounted on member 20 and carry freely rotatable idler sprockets 35 and 37 on the ends thereof. Springs 39 and 41 bias arms 31 and 33 toward movement in a direction engaging sprockets 35 and 37 with chains 30 and 32, respectively. Thus, excessive slack is effectively removed from the chains. Sprockets 34 and 36 are affixed to stub shafts 38 and 40 which are journaled in upper lateral member 20 of frame 16. Shafts 38 and 40 are connected, through universal type joints and spring clutches 42 and 44, to drive shafts 46 and 48. The latter transmit power to gear boxes 50 and 52, each having a respective shaft 54 and 56 extending downwardly therefrom, substantially at right angles to shafts 46 and 48.

Figure 2:
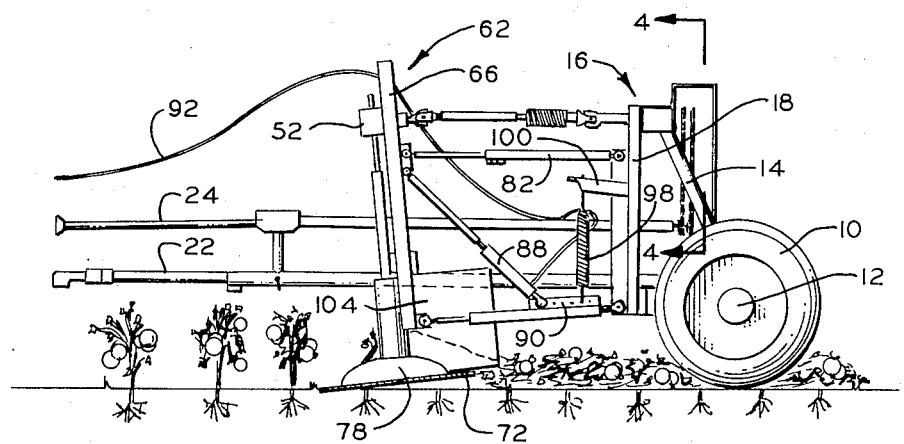
FIG. 2 is a side elevational view of the apparatus of FIG. 1.
Figure 3:
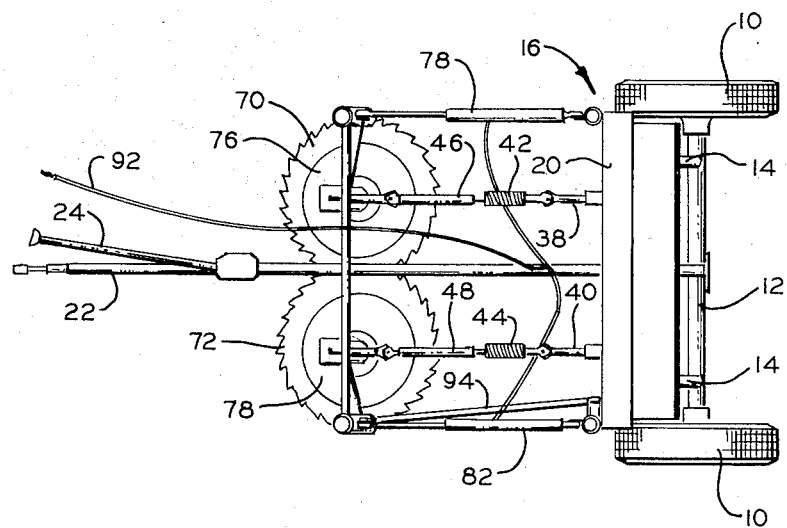
FIG. 3 is a top plan view thereof.

Sleeves 58 and 60 are rigidly affixed to disk mounting frame, indicated generally by reference numeral 62, comprising upright structural members 64 and 66, and lateral members 68. Shafts 54 and 56 extend through sleeves 58 and 60, respectively, and have mounted on the ends thereof remote from the gear boxes, rotary cutter disks 70 and 72. The gearing in boxes 50 and 52 is reversed so that, although drive shafts 46 and 48 are rotating in the same direction, cutter disks 70 and 72 are rotating in opposite directions, with the forward edges moving toward one another, as indicated by arrows 74. Both of the disks have saw-tooth cutting edges which are overlapped, as shown in FIGS. 1 and 3, so that stems, roots, etc., of crops coming between the disks are severed thereby. If the disks are adjusted to operate below ground level, shallow growing crops such as beets, turnips, and the like, may be dug up and neatly windrowed. Dome-shaped elements 76 and 78 are preferably provided on the upper surfaces of the cutter disks. As is particularly apparent from FIGS. 2 and 3, the overlapped edges of cutter disks 70 and 72 are substantially midway between axle 12 and the points of attachment of tongue 22 to the tractor.

Frame 62 is supported with respect to frame 16 by a parallelogram linkage comprising upper and lower rods 78 and 80 on one side, and 82 and 84 on the other. All four rods are adjustable in length, and all are pivoted at both ends to the respective frames. A pair of hydraulic cylinders 86 and 88 extend between frame 62 and brackets rigidly affixed to rods 80 and 84. One of the brackets is seen in FIG. 1 and indicated by reference numeral 90. Cylinders 86 and 88 are connected by line 92 to the tractor hydraulic system for selective actuation through appropriate valves (now shown). Extension and retraction of the cylinders will serve to lift and lower frame 62, and thereby cutter disks 70 and 72, pivoting the parallelogram linkage about the connections of the rods to frame 16.

The adjustment of the lengths of the linkage rods controls the tilt of frame 62, and thereby the cutter disks. For many applications it is preferred that the rods are adjusted so that frame 62, while remaining in an essentially vertical plane, is tilted slightly forward so that the leading edges of the cutter disks are lower than the trailing edges, as shown in FIG. 2. Drive shafts 46 and 48 are made in two pieces slidably connected and keyed or splined to allow relative longitudinal motion, but not relative rotational motion, to accomodate changes in the lengths of the rods. Stabilizer bar 94 is provided on one side of the linkage to provide lateral stability. Springs 96 and 98 extend between rigid brackets 100 and rods 80 and 84 to support to some extent the weight of frame 62 and the elements mounted thereon.

As the apparatus is drawn along behind the tractor, rotary motion is transmitted from the power take off through shaft 24, the sprockets and chains, drive shafts 46 and 48, gear boxes 50 and 52, and shafts 54 and 56 to cutter disks 70 and 72. The crop being cut may be, for example, tomato plants, beet or turnip tops, or other crops planted in spaced rows. The cutting machine is drawn along with the point of overlapping of the edges of the cutter disks moving along the row. The forward edges of the disks may be positioned either above or below ground level, depending on the crop being harvested. For some crops, like beets for example, it may be desirable to make two passes along each row; on the first pass the cutter disks are adjusted to cut off the tops of the beets, and on the second pass the blades are positioned below ground level to dig up the beets themselves. As shown in FIG. 2, when the disk are below ground level a mound of dirt is left behind, in a row between wheels 10, and the crops which are cut off and/or dug up are neatly windrowed. Guides or shields 102 and 104 are supported in vertical planes behind each cutter disk to prevent the dirt, rocks and crops from being thrown outwardly by the trailing edges of the disks.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A crop cutting or digging machine comprising, in combination:
    a. a rigid main frame;
    b. a pair of cutter disks having overlapping edges and arranged in side-by-side relationship with respect to the direction of movement of the machine;
    c. means for imparting rotation to said disks in opposite directions so that the forward edges are moving toward one another;
    d. a mounting frame upon which said disks are supported,
    e. a parallelogram linkage pivotally connecting said mounting frame to said main frame for selectively adjusting said mounting frame with respect to said main frame to move said disks vertically between positions wherein said forward edges are above and below ground level; and
    f. a pair of wheels and axle upon which said main frame is rigidly supported and a tongue extending forwardly from said axle for attachment to means for pulling the machine, and cutter disks being disposed substantially midway between said wheels and the point of attachment of said tongue.

2. The invention according to claim 1 wherein said adjusting means further includes a powered linear actuator for moving said parallelogram linkage.

3. The invention according to claim 1 wherein said means for imparting rotation comprises a single rotatable shaft carrying a pair of sprockets, and drive chain for transmitting rotation from said sprockets to individual drive shafts for each of said disks.

4. The invention according to claim 1 and further including additional adjusting means for selectively tilting the plane of said mounting frame about a horizontal axis transverse to the direction of movement of the machine.

5. The invention according to claim 1 and further including a pair of essentially flat shields rearwardly adjacent said cutter disks and disposed in vertical planes to prevent material passing over said disks from being propelled outwardly by the trailing edges thereof.

6. The invention according to claim 1 wherein said mounting frame is resiliently supported by spring means attached at one end to a rigid support on said main frame and at the other end to a portion of said parallelogram linkage.

7. The invention according to claim 6 wherein the vertical position of said mounting frame, and thereby said cutter disks, is adjustably maintained by an extensible and retractible linear actuator attached at one end to said mounting frame and at the other end to a portion of said linkage.

* * * * *